US00RE41714E

(19) United States
(12) Reissued Patent
Moriya

(10) Patent Number: US RE41,714 E
(45) Date of Reissued Patent: Sep. 21, 2010

(54) VALVE CHARACTERISTIC CHANGING APPARATUS FOR INTERNAL COMBUSTION ENGINE

(75) Inventor: Yoshihito Moriya, Nagoya (JP)

(73) Assignee: Toyota Jidosha Kabushiki Kaisha, Toyota-shi (JP)

(21) Appl. No.: 11/602,413

(22) Filed: Nov. 21, 2006

Related U.S. Patent Documents

Reissue of:
(64) Patent No.: 7,082,913
Issued: Aug. 1, 2006
Appl. No.: 11/045,370
Filed: Jan. 31, 2005

(30) Foreign Application Priority Data

Mar. 3, 2004 (JP) ..... 2004-059463

(51) Int. Cl.
*F01L 1/34* (2006.01)

(52) U.S. Cl. ..... 123/90.17; 123/90.15; 123/90.31; 123/90.16; 123/90.11; 251/129.03

(58) Field of Classification Search ..... 123/90.15, 123/90.16, 90.17, 90.31
See application file for complete search history.

(56) References Cited

U.S. PATENT DOCUMENTS 5,417,186 A 5/1995 Elrod et al.
5,715,779 A * 2/1998 Kato et al. ..... 123/90.15
6,260,524 B1 * 7/2001 Wachi ..... 123/90.15
6,325,029 B1 * 12/2001 Takahashi ..... 123/90.15
6,401,675 B1 * 6/2002 Nakamura et al. ..... 123/90.15
2001/0008129 A1 7/2001 Yamada
2002/0108592 A1 * 8/2002 Takemura et al. ..... 123/90.17

FOREIGN PATENT DOCUMENTS

EP 1 008 728 A1 6/2000
JP A 5-332105 * 12/1993
JP A 6-2512 * 1/1994
JP A 7-238815 * 9/1995
JP U 3044296 * 10/1997
JP A 2000-110527 * 4/2000
WO WO 2004/011778 A1 2/2004

* cited by examiner

*Primary Examiner*—Zelalem Eshete
(74) *Attorney, Agent, or Firm*—Kenyon & Kenyon LLP

(57) ABSTRACT

A value characteristic changing apparatus for an internal combustion engine according to the invention is provided with an intake-side variable valve timing mechanism that changes a valve timing of an intake valve of an internal combustion engine, and an exhaust-side variable valve timing mechanism that changes a valve timing of an exhaust valve. The intake-side variable valve mechanism is a mechanism that uses an storage battery as a power source; the exhaust-side variable valve timing mechanism is a mechanism that uses a hydraulic pump of an engine driving type as a power source.

13 Claims, 10 Drawing Sheets

VALVE CHARACTERISTIC CHANGING APPARATUS FOR INTERNAL COMBUSTION ENGINE

Matter enclosed in heavy brackets [ ] appears in the original patent but forms no part of this reissue specification; matter printed in italics indicates the additions made by reissue.

INCORPORATION BY REFERENCE

The disclosure of Japanese Patent Application No. 2004-059463 filed on Mar. 3, 2004, including the specification, drawings and abstract is incorporated herein by reference in its entirety.

BACKGROUND OF THE INVENTION

1. Field of the Invention

The invention relates to a valve characteristic changing apparatus for an internal combustion engine that is provided with a plurality of varying mechanisms that separately vary a valve characteristic of a plurality of engine valves.

2. Description of the Related Art

A variable valve timing mechanism is widely used in internal combustion engines for vehicles and the like for the purpose of improving engine performance, including output performance, fuel consumption performance, and exhaust performance. A variable valve timing mechanism varies the opening timing and/or closing timing of an engine valve, a so-called valve timing, in accordance with the engine operating condition. Many such variable valve timing mechanisms are drivingly connected to a crankshaft serving as an engine output shaft, and driven by hydraulic pressure generated from a hydraulic pump that operates in accordance with the rotation of the crankshaft.

In recent years, valve timing changing apparatuses have been proposed which provide a plurality of variable valve timing mechanisms. For example, there is an apparatus that separately provides a variable valve timing mechanism such as described above for an intake valves and exhaust valves (refer to Japanese Patent Laid-Open Publication No. 2000-110527 (JP-A-2000-110527) for an example), and an apparatus that separately provides the variable valve timing mechanism for intake valves and exhaust valves in each bank of a V-shaped internal combustion engine.

Normally in the above valve timing changing apparatus, the hydraulic pressure generated from the hydraulic pump is distributed and supplied to the plurality of variable valve timing mechanisms. Each variable valve timing mechanism then operates based upon the supplied hydraulic pressure. In addition, the operation of each variable valve timing mechanism in the valve timing change apparatus is often synchronized in order to change the valve timing in accordance with the engine operating condition.

Therefore, it is difficult in the above apparatus to supply sufficient hydraulic pressure to each variable valve timing mechanism during times of change in the engine operating condition. Moreover, this is likely to decrease operation response. In cases where a hydraulic pump with high output performance is used to improve operation response, such a pump increases size and is thus not preferable.

It should be noted that the aforementioned problems occur not only in an apparatus provided with a plurality of hydraulic pump-driven variable valve timing mechanisms as described in detail above, but also in other valve timing changing apparatus provided with a plurality of variable valve timing mechanisms that are operated via the same drive train, such as a plurality of electrically-driven variable valve timing mechanisms. Furthermore, the above description pertains to a variable valve timing mechanism that changes a valve timing; however, related art also includes that with substantially the same problem in a varying mechanism that changes a so-called valve characteristic, for example, a lift amount or the like.

SUMMARY OF THE INVENTION

It is an object of the invention to provide a valve characteristic changing apparatus for an internal combustion engine that is capable of appropriately suppressing a decrease in operation response in each of a plurality of varying mechanisms.

A first aspect of the invention relates to a valve characteristic changing apparatus for an internal combustion engine. The valve characteristic changing apparatus has a first mechanism group which includes at least one first varying mechanism that changes a valve characteristic of at least one first engine valve; a second mechanism group which includes at least one second varying mechanism that changes a valve characteristic of at least one second engine valve; a first power source group including at least one first power source for the first mechanism group; and a second power source group including at least one second power source for the second mechanism group.

The valve characteristic changing apparatus may have three or more mechanism groups and power sources, for example, the first to third mechanism groups and the first to third power sources, or the first to fourth mechanism groups and the first to fourth power sources.

According to the valve characteristic changing apparatus, compared to a structure driving a plurality of varying mechanisms with a common power source, such a structure can easily secure the power required by each varying mechanism group through each power source group. It is thus possible to appropriately suppress a decrease in operation response in each of the plurality of varying mechanism groups.

It should also be noted that a "valve characteristic" may refer to intake valve and exhaust valve characteristics such as an opening timing, closing timing, lift amount and the like, or any combination thereof. An example of changing a combination thereof as the valve characteristic is simultaneously changing both the opening timing and closing timing of each valve.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

Hereinafter, a description is given of an embodiment specifying a valve characteristic changing apparatus for an internal combustion engine according to the invention.

Figure 1:
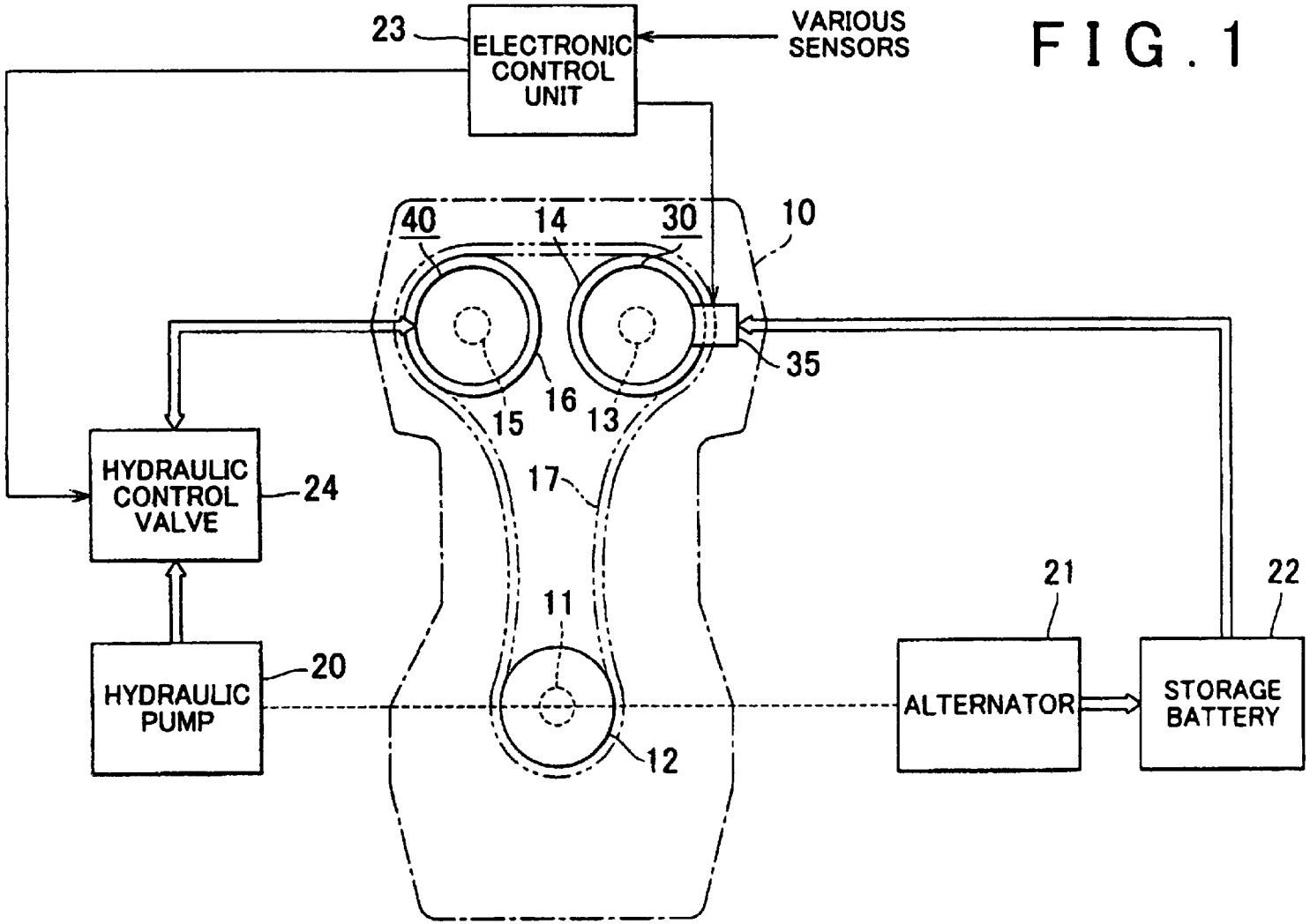
FIG. 1 is a block diagram showing a schematic structure of an embodiment of a valve characteristic changing apparatus for an internal combustion engine according to the invention.

FIG. 1 shows a schematic structure of an engine system to which the embodiment is applied.

As shown in FIG. 1, a crank pulley 12 is integrally and rotatably fixed to an end of a crankshaft 11 serving as an output shaft of an internal combustion engine 10. The crank pulley 12 is drivingly connected via a timing belt 17 to an intake-side cam pulley 14 disposed on an end of an intake-side camshaft 13, and an exhaust-side cam pulley 16 disposed on an end of an exhaust-side camshaft 15.

The intake-side cam pulley 14 is connected to the intake-side camshaft 13 via an intake-side variable valve timing mechanism 30. Furthermore, the exhaust-side cam pulley 16 is connected to the exhaust-side camshaft 15 via an exhaust-side variable valve timing mechanism 40. In the embodiment, the intake-side variable valve timing mechanism 30 functions as an intake-side varying mechanism and the exhaust-side variable valve timing mechanism 40 functions as an exhaust-side varying mechanism. Moreover, both an opening timing and closing timing of an intake valve are varied by the intake-side variable valve timing mechanism 30 at the same time the exhaust-side variable valve timing mechanism 40 varies both an opening timing and closing timing of an exhaust valve. Note that the specific structures of the intake-side variable valve timing mechanism 30 and the exhaust-side variable valve timing mechanism 40 will be described later.

Meanwhile, the crankshaft 11 is also drivingly connected via the timing belt 17 to a hydraulic pump 20 and an alternator 21. Hydraulic pressure generated from the hydraulic pump 20 is supplied to an engine lubricating system, and each lubrication portion of the internal combustion engine 10. Furthermore, electric power generated from the alternator 21 is stored in an storage battery 22, as well as supplied to various electrical components of the internal combustion engine 10.

The above engine system has various sensors in order to detect information required for engine control. Such provided sensors include, for example, a crank sensor for detecting a rotational phase of the crankshaft 11, a position sensor for detecting a valve timing of the intake valve (hereinafter referred to as intake valve timing), and a position sensor for detecting a valve timing of the exhaust valve (hereinafter referred to as exhaust valve timing).

Furthermore, the above engine system has an electronic control unit 23 including a microcomputer or the like. The electronic control unit 23 receives detection signals from the various sensors and performs various calculations. Based on the calculation results, the electronic control unit 23 executes various controls related to engine control. It should be noted that the electronic control unit 23 performs operation control of the intake-side variable valve timing mechanism 30 and operation control of the exhaust-side variable valve timing mechanism 40 as aspects of such engine control.

In the embodiment, the intake-side variable valve timing mechanism 30 and the exhaust-side variable valve timing mechanism 40 are designed so as to use independent and separate power sources, the reason for which is given below.

There is an unstable trend in the combustion state of the internal combustion engine 10 in a low engine speed region, such as when the engine is started, compared to high engine speed region. Thus, varying an intake air amount and supply time through the intake valve timing, as well as the supply mode of intake air, are important factors in stabilizing such an unstable combustion state. Accordingly, using a type of variable valve timing mechanism driven by a power source dependent on the engine speed, whose maximum generated power is varied, as the variable valve timing mechanism 30 may result in inadequate maximum generated power of the power source for a low engine speed region. Consequently, the desired driving force cannot be generated, and the combustion state of the internal combustion engine 10 may become unstable due to limitations of a response speed upon varying the intake valve liming.

In consideration of the above circumstances, the embodiment uses a drive train driven by a power source, whose maximum generated power is not dependent on the engine speed, as the drive train for driving the intake-side variable valve timing mechanism 30. More specifically, the embodiment uses an electrical drive train driven by an electric motor 35 with the storage battery 22 as its power source. Thus, the response speed required for changing the intake valve timing in a low engine speed region can also be secured, resulting in a stable engine combustion state.

Meanwhile, the exhaust valve timing is one factor exerting a significant influence on the exhaust efficiency of the internal combustion engine 10. Improving such exhaust efficiency is preferred for high engine speed region in particular, because the total amount of exhaust gas is larger.

This point is recognized in the embodiment, which uses a hydraulic pressure drive train, with the hydraulic pump 20 serving as a power source, as the drive train for driving the exhaust-side variable valve timing mechanism 40. Thus, a sufficient output of the hydraulic pump 20 is secured in a high engine speed region, that is, when the crankshaft 11 rotates at a high speed. As a result, an excellent response is secured when changing the exhaust valve timing in a high engine speed region, where the improvement of exhaust efficiency is desired.

Hereinafter, descriptions are given of the specific structures of the intake-side variable valve timing mechanism 30 and the exhaust-side variable valve timing mechanism 40.

First, the specific structure of the intake-side variable valve timing mechanism 30 will be described.

Figure 2:
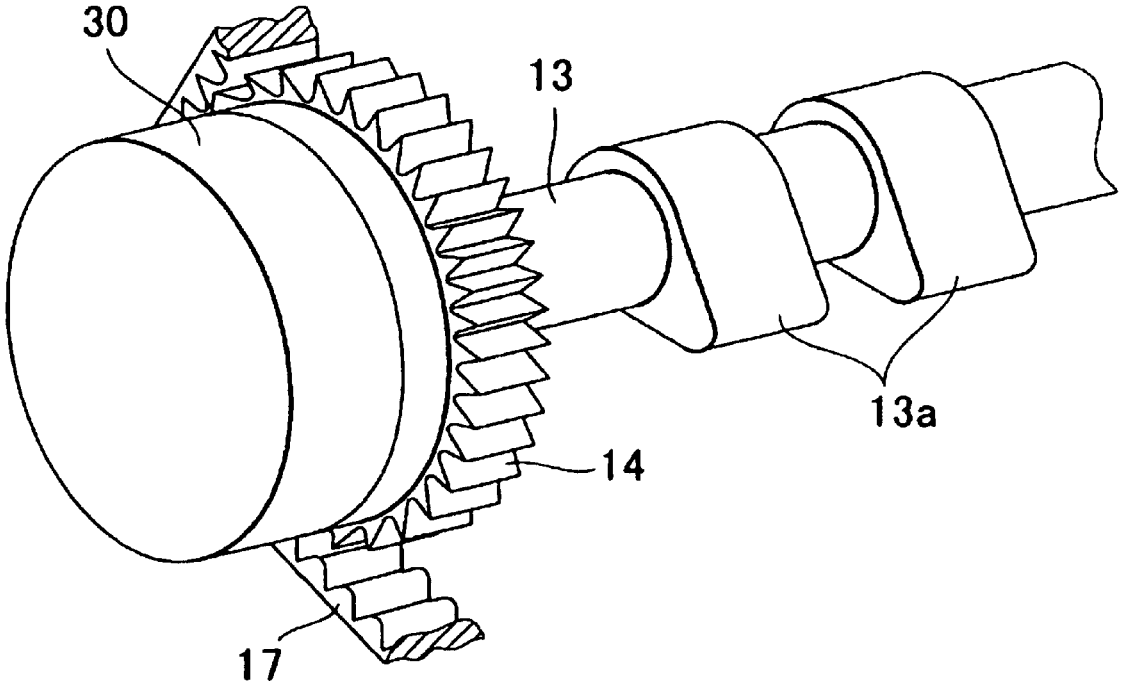
FIG. 2 is an oblique perspective drawing showing an oblique view of a structure of an intake-side variable valve timing mechanism in the embodiment.

FIG. 2 shows an oblique view of the structure of the intake-side variable valve timing mechanism 30.

As shown in FIG. 2, the intake-side variable valve timing mechanism 30 changes a relative rotational phase of the intake-side camshaft 13 with respect to a rotational phase of the intake-side cam pulley 14 (more specifically, the crankshaft 11 (FIG. 1)). This changes a rotational phase of a cam 13a fixed to the intake-side camshaft 13, and by extension, the intake valve timing of the intake valve driven by the cam 13a.

Figure 3:
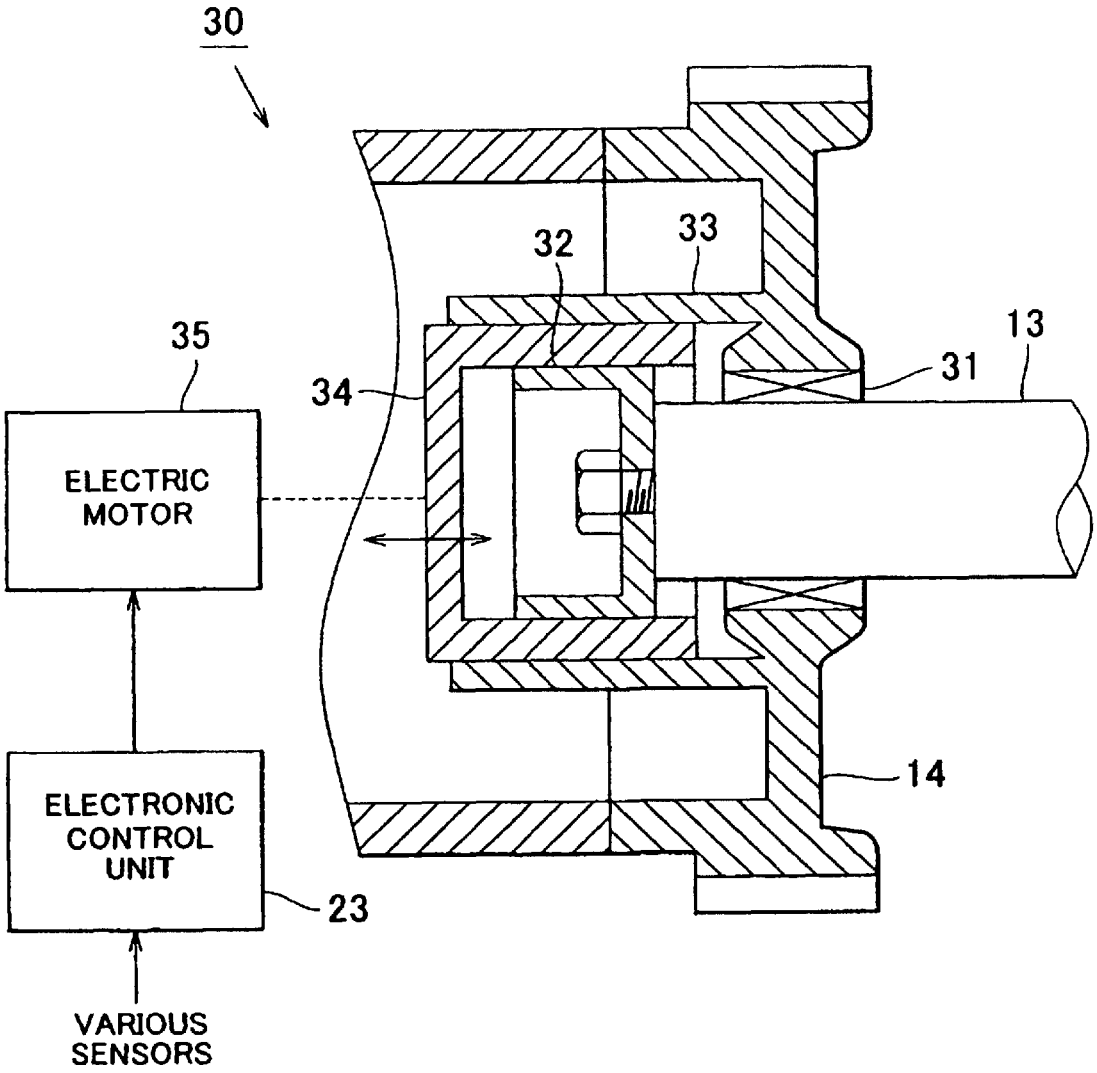
FIG. 3 is a cross-sectional drawing showing a cross-sectional structure of the intake-side variable valve timing mechanism.

FIG. 3 shows a cross-sectional structure of the intake-side variable valve timing mechanism 30.

As shown in FIG. 3, the intake-side cam pulley 14 is provided rotatable relative to the intake-side camshaft 13 via a bearing 31.

The intake-side variable valve timing mechanism 30 includes a fixed gear 32 fixed to the intake-side camshaft 13, a fixed gear 33 fixedly formed with the intake-side cam pulley 14, and a piston gear 34 provided between the fixed gears 32, 33.

Fixed gears 32, 33 are both formed in a cylindrical shape. The fixed gears 32, 33 are respectively disposed such that the fixed gear 33 covers the outside of the fixed gear 32 leaving a predetermined clearance. An outer circumference of the fixed gear 32 and an inner circumference of the fixed gear 33 are respectively formed with helical teeth. The direction of the helical teeth formed on the outer circumference of the fixed gear 32 is opposed to the helical teeth formed on the inner circumference of the fixed gear 33.

The piston gear 34 is disposed between the fixed gears 32, 33 movable in the axial direction of the intake-side camshaft 13. An inner circumference and an outer circumference of the piston gear 34 are both formed with helical teeth, and respectively engage the helical teeth on the outer circumference of the fixed gear 32 and the helical teeth on the inner circumference of the fixed gear 33.

Accordingly, moving the piston gear 34 results in the relative rotation of both the fixed gears 32, 33 in opposing directions along the tooth lines of the helical teeth of the piston gear 34. This allows changes in the relative rotational phase of the intake-side camshaft 13 with respect to the intake-side cam pulley 14.

It should be noted that the electric motor 35 for moving the piston gear 34 is provided in the intake-side variable valve timing mechanism 30. The electric motor 35 is connected to the piston gear 34 via a gear, bearing or the like. A position control of the piston gear 34 is executed through the operation control of the electric motor 35, thereby changing the relative rotational phase of the intake-side camshaft 13, and by extension, the intake valve timing.

The valve timing control mentioned above is specifically executed as follows. Based upon the detection signals of the various sensors, the electronic control unit 23 calculates a valve timing (target valve timing) of the intake valve that is appropriate to the engine operating condition at that time. In cases where the target valve timing differs from the actual intake valve timing, the electronic control unit 23 executes operation control of the electric motor 35 so as to move the piston gear 34 in a direction that reduces the difference. Thus, the fixed gear 32 rotates relative to the fixed gear 33, resulting in adjustment of the intake valve timing.

After the adjustment described above, the electronic control unit 23 executes operation control of the electric motor 35 so as to stop movement of the piston gear 34 once the target valve timing and the actual intake valve timing coincide with each other. Thus, the relative rotational phase of the fixed gear 32, and by extension, the intake valve timing is maintained.

Next, the structure of the exhaust-side variable valve timing mechanism 40 (FIG. 1) will be described in detail.

The exhaust-side variable valve timing mechanism 40 changes a relationship between the rotational phase of the exhaust-side camshaft 15 and the rotational phase of the exhaust-side cam pulley 16 (more specifically, the crankshaft 11). This changes a rotational phase of a cam provided on the exhaust-side camshaft 15, and by extension, the exhaust valve timing of the exhaust valve driven by the cam.

Figure 4:
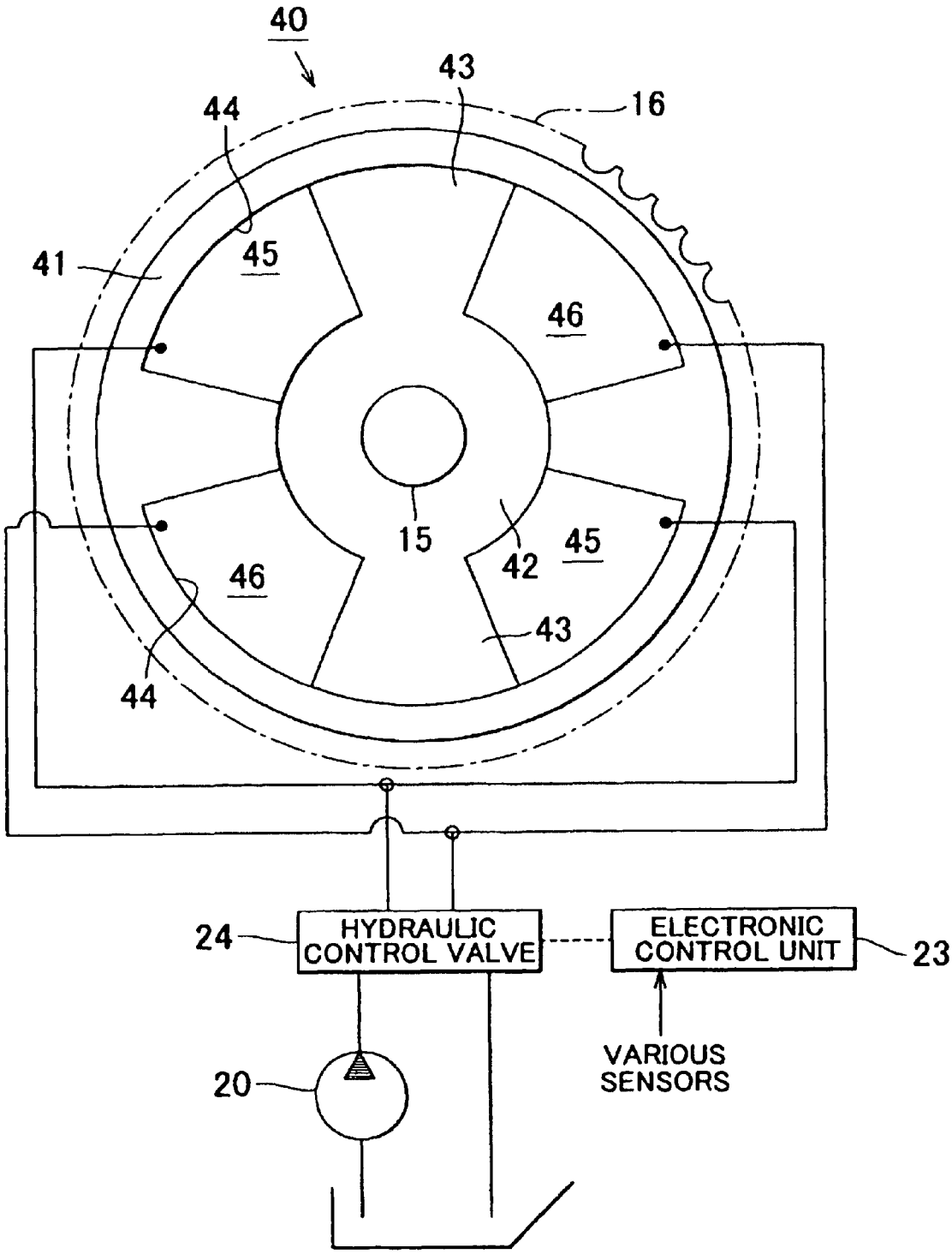
FIG. 4 is a block diagram showing a schematic structure of an exhaust-side variable valve timing mechanism and hydraulic circuit thereof in the embodiment.

FIG. 4 shows a schematic structure of the exhaust-side variable valve timing mechanism 40 and a hydraulic circuit thereof.

As shown in FIG. 4, the exhaust-side variable valve timing mechanism 40 includes a substantially toric housing 41 and a vane body 42 accommodated therewithin. The vane body 42 is fixedly and rotatably connected to the exhaust-side camshaft 15 and the housing 41 is fixedly and rotatably connected to the exhaust-side cam pulley 16.

A plurality of vanes 43 are formed on an outer periphery of the vane body 42 extending in a radial direction thereof. In addition, a plurality of grooves 44 are formed on an inner periphery of the housing 41 extending in a peripheral direction thereof. The vanes 43 are respectively disposed in the grooves 44. An advance-side pressure chamber 45 and a delay-side pressure chamber 46 are respectively formed in each groove 44 as defined by the vanes 43.

The advance-side pressure chamber 45 and the delay-side pressure chamber 46 are connected to a hydraulic control valve 24 via respective and appropriate oil passages. Hydraulic pressure generated from the hydraulic pump 20 is supplied to the hydraulic control valve 24. Based upon a signal input from the electronic control unit 23, the hydraulic control valve 24 operates to supply hydraulic pressure in the advance-side pressure chamber 45 or the delay-side pressure chamber 46, and discharge hydraulic oil from within the advance-side pressure chamber 45 or the delay-side pressure chamber 46. Thus, the relative rotational phase of the vane 43 in the groove 44 is set to a desired phase depending on the difference in hydraulic pressure inside the advance-side pressure chamber 45 and the delay-side pressure chamber 46 formed on both sides of the vane 43. The vane body 42 consequently rotates relative to the housing 41, changing the relative rotational phase of the exhaust-side camshaft 15 with respect to the exhaust-side cam pulley 16, and by extension, the exhaust valve timing.

The valve timing mentioned above is specifically executed as follows.

Based upon the detection signals of the various sensors, the electronic control unit 23 calculates a valve timing (target valve timing) of the exhaust valve that is appropriate to the engine operating condition at that time.

In cases where the target valve timing differs from the actual exhaust valve timing, the electronic control unit 23 executes operation control of the hydraulic control valve 24 so as to discharge hydraulic oil from either the advance-side pressure chamber 45 or the delay-side pressure chamber 46, and supply hydraulic pressure generated from the hydraulic pump 20 to the other chamber. Thus, the vane 42 rotates relative to the housing 41 in accordance with the generated pressure difference between the advance-side pressure chamber 45 and the delay-side pressure chamber 46, resulting in adjustment of the exhaust valve timing.

After the adjustment described above, the electronic control unit 23 executes operation control of hydraulic control valve 24 so as to stop the supply and discharge of hydraulic oil to the advance-side pressure chamber 45 and the delay-side pressure chamber 46 once the target valve timing and the actual exhaust valve timing coincide with each other.

Thus, the pressure of the advance-side pressure chamber 45 and the delay-side pressure chamber 46 is kept equal, whereby the relative rotational phase of the vane body 42, and by extension, the exhaust valve timing are maintained.

According to the embodiment as described above, the following effects can be obtained.

(1) The intake-side variable valve timing mechanism 30 and the exhaust-side variable valve timing mechanism 40 are mechanisms designed to use independent and separate power sources. Therefore, the driving force required by the mechanisms 30, 40 can be generated in the appropriate amount by each power source, as compared with structures that drive the intake-side variable valve timing mechanism 30 and the exhaust-side variable valve timing mechanism 40 with a common power source. Thus, a decrease in the operation response of the mechanisms 30, 40 can be suppressed to the utmost extent. By extension, a response delay regarding variations of the intake valve timing and exhaust valve timing, which are changed through the mechanisms 30, 40, can also be suppressed. It is also possible to quickly converge an actual valve timing on a target timing.

(2) Furthermore, intake and exhaust characteristics can be improved, because different power sources are selected as suitable power sources respectively corresponding to the response required by the intake valve and the exhaust valve.

(3) The storage battery 22 is employed as the power source for the intake-side variable valve timing mechanism 30. Storing energy generated from the alternator 21 in advance thus assures that the maximum generated power, independent of the engine speed, is secured, and also assures that the response speed required for changing the intake valve timing in a low engine speed region is secured. By extension, it is therefore possible to stabilize the engine combustion state.

(4) The hydraulic pump 20 is employed as the power source for the exhaust-side variable valve timing mechanism 40, thus assuring that an excellent response is secured for changing the exhaust valve timing in a high engine speed region, where improvement in exhaust efficiency is desired.

(5) Since a pump for lubricating oil is used as the hydraulic pump 20, which delivers, under pressure, lubricating oil to the lubricating system of the internal combustion engine 10, commonization of the engine structure, and by extension, a reduction in the size of the engine structure is also possible.

The structure of the embodiment described in detail above may also be modified as follows.

In the intake-side variable valve timing mechanism 30 of the above embodiment, the piston gear 34 is moved relative to the fixed gears 32, 33 through the operation control of the electric motor 35, thus changing the relative rotational phase of the intake-side camshaft 13 with respect to the intake-side cam pulley 14. If the relative rotational phase is modifiable, for example, direct relative turning of the intake-side camshaft 13 by an electric motor or the like, the structure of the intake-side variable valve timing mechanism may be suitably modified.

In addition, if the intake-side variable valve timing mechanism 30 is a mechanism that uses the storage battery 22 as a power source, the mechanism is not limited to operation by an electric motor. For example, a mechanism that is operated by another electric actuator such as an electric hydraulic pump, electromagnetic clutch, electromagnetic brake or the like may also be used.

In the above embodiment, a mechanism using the hydraulic pump 20, which delivers, under pressure, lubricating oil to the lubricating system of the internal combustion engine 10, is employed as the exhaust-side variable valve timing mechanism 40. However, as long as a hydraulic pump of an engine driving type is used, a hydraulic pump that generates hydraulic pressure for operating other hydraulic units, a hydraulic pump provided exclusively for the above purpose or the like may be used in place of the hydraulic pump 20. A hydraulic pump that generates hydraulic pressure for the operation and lubrication of a transmission may also be used in an apparatus mounted in a vehicle with a transmission. Furthermore, the type of pump is not limited to a hydraulic pump, and a fluid pressure pump that discharges fluid other than oil, such as air, water or the like, may also be used.

If the operation response of the mechanisms 30, 40 can be secured, the intake-side variable valve timing mechanism 30 may be a mechanism that uses a fluid pressure pump of an engine driving type for a power source. Furthermore, the exhaust-side variable valve timing mechanism 40 may be a mechanism that uses the storage battery 22 for a power source. Using different power sources such as a hydraulic pump, a pneumatic pump, the storage battery 22 or the like as power sources of the mechanisms 30, 40 makes possible the selection of a suitable power source corresponding to the response required for changing the valve timing of the intake valve and the exhaust valve. Thus, intake and exhaust characteristics can be improved.

The mechanisms 30, 40 may also be mechanisms that both use storage batteries 22 or fluid pressure pumps as a power source. For example, when providing two power sources in such a structure, one power source may be provided corresponding to the intake-side variable valve timing mechanism 30, and the other power source may be provided corresponding to the exhaust-side variable valve timing mechanism 40. The effect described in (1) above can also be obtained by this structure.

Figure 5:
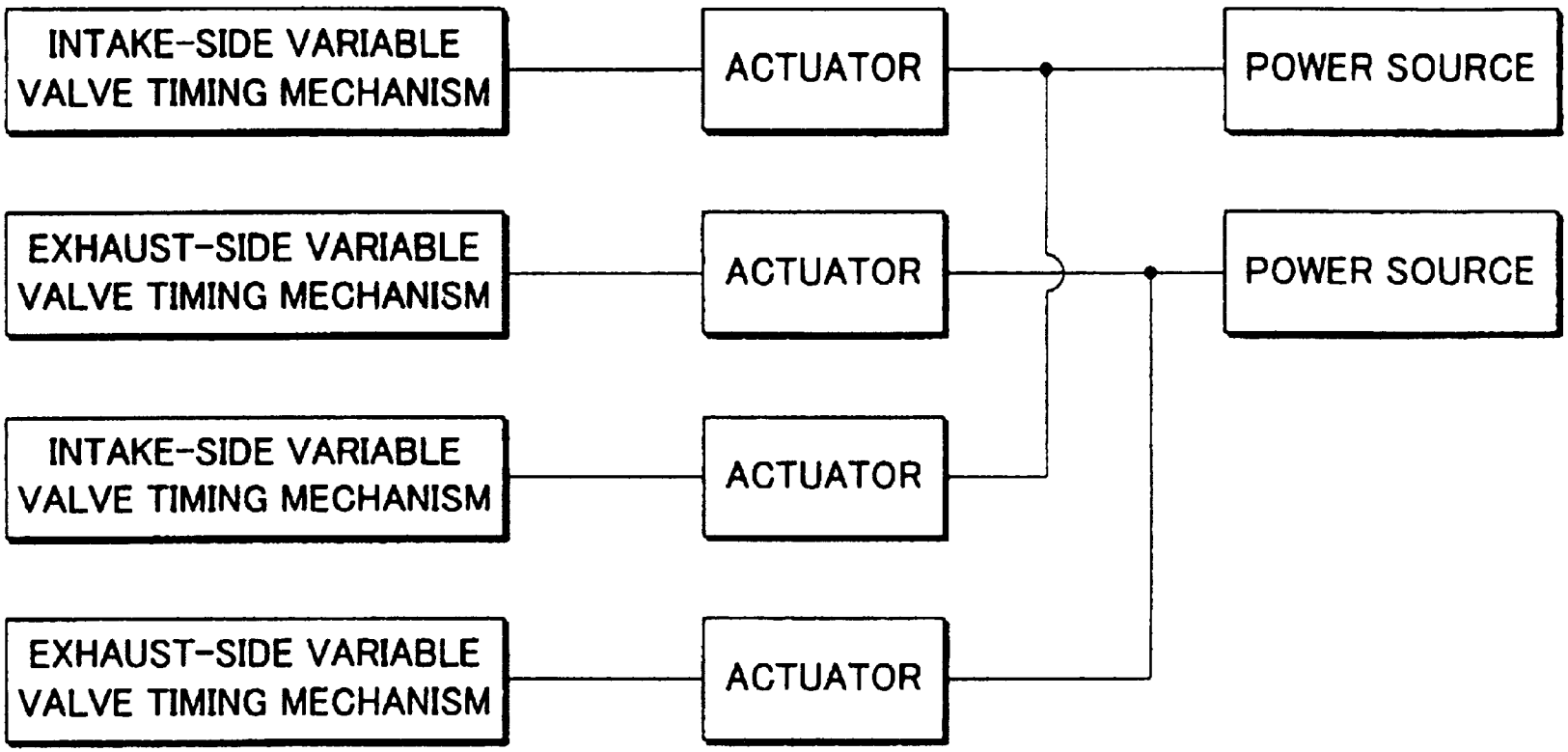
FIG. 5 is a block diagram showing a schematic structure of a valve characteristic changing apparatus according to another embodiment.
Figure 6:
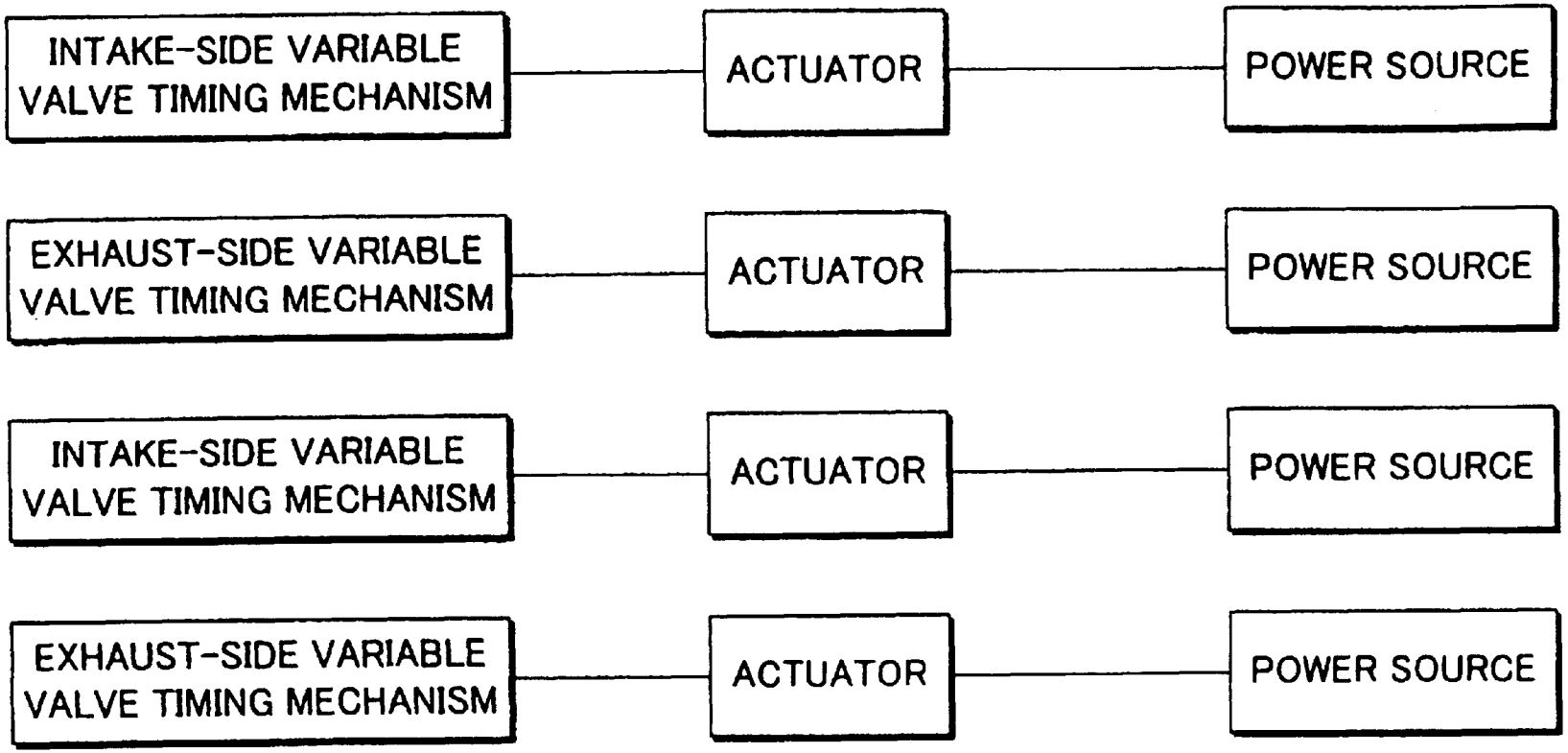
FIG. 6 is a block diagram showing a schematic structure of a valve characteristic changing apparatus according to another embodiment.

The invention is also applicable to an apparatus with a plurality of intake-side variable valve timing mechanisms and exhaust-side variable valve timing mechanisms. As shown in FIG. 5, in such a structure, independent and separate power sources may be respectively provided. A power source corresponds to a plurality of intake-side variable valve timing mechanisms. Another power source corresponds to a plurality of exhaust-side variable valve timing mechanisms. In addition, as shown in FIG. 6, independent and separate power sources may also be respectively provided corresponding to each variable valve timing mechanism.

Figure 7:
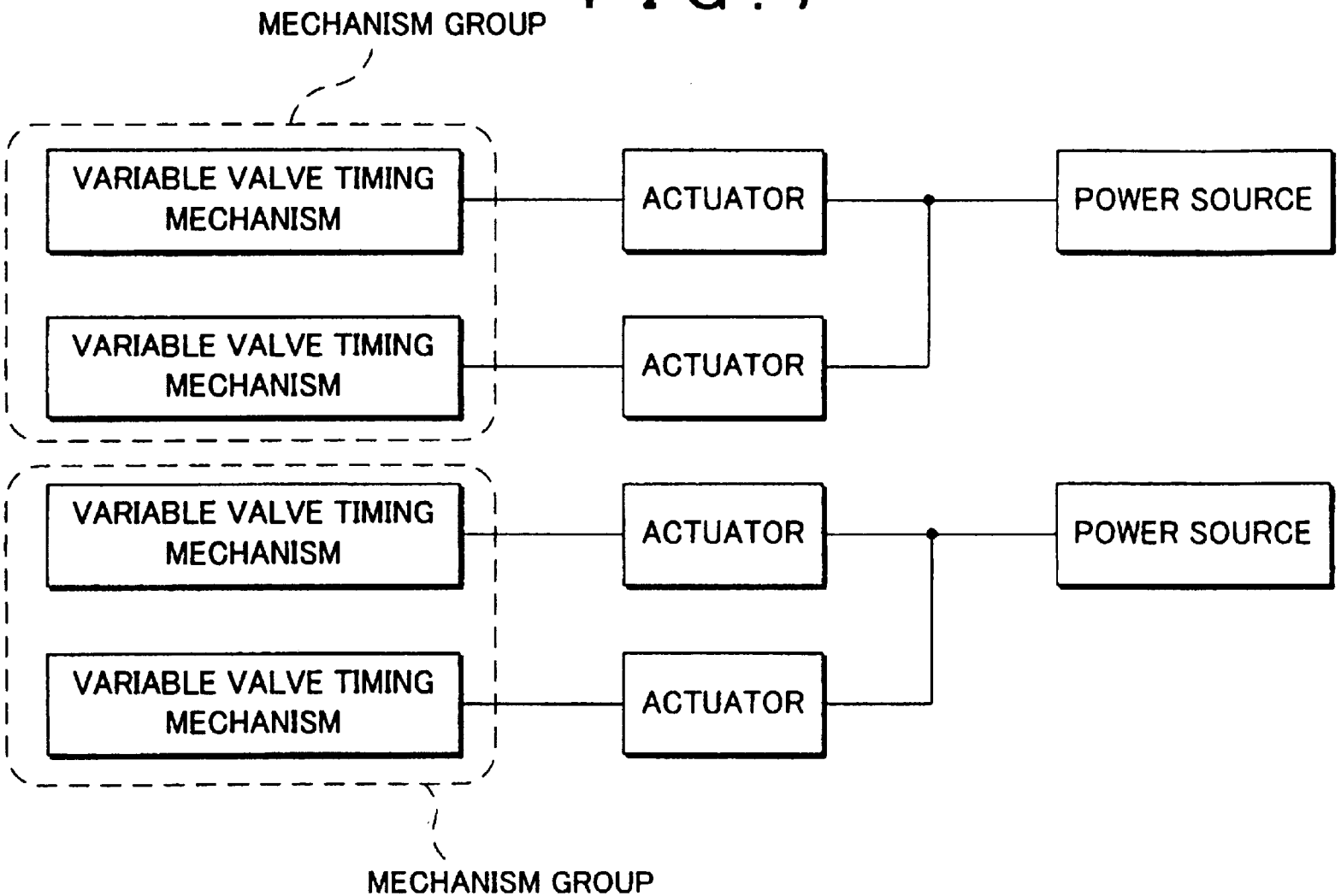
FIG. 7 is a block diagram showing a schematic structure of a valve characteristic changing apparatus according to another embodiment.
Figure 8:
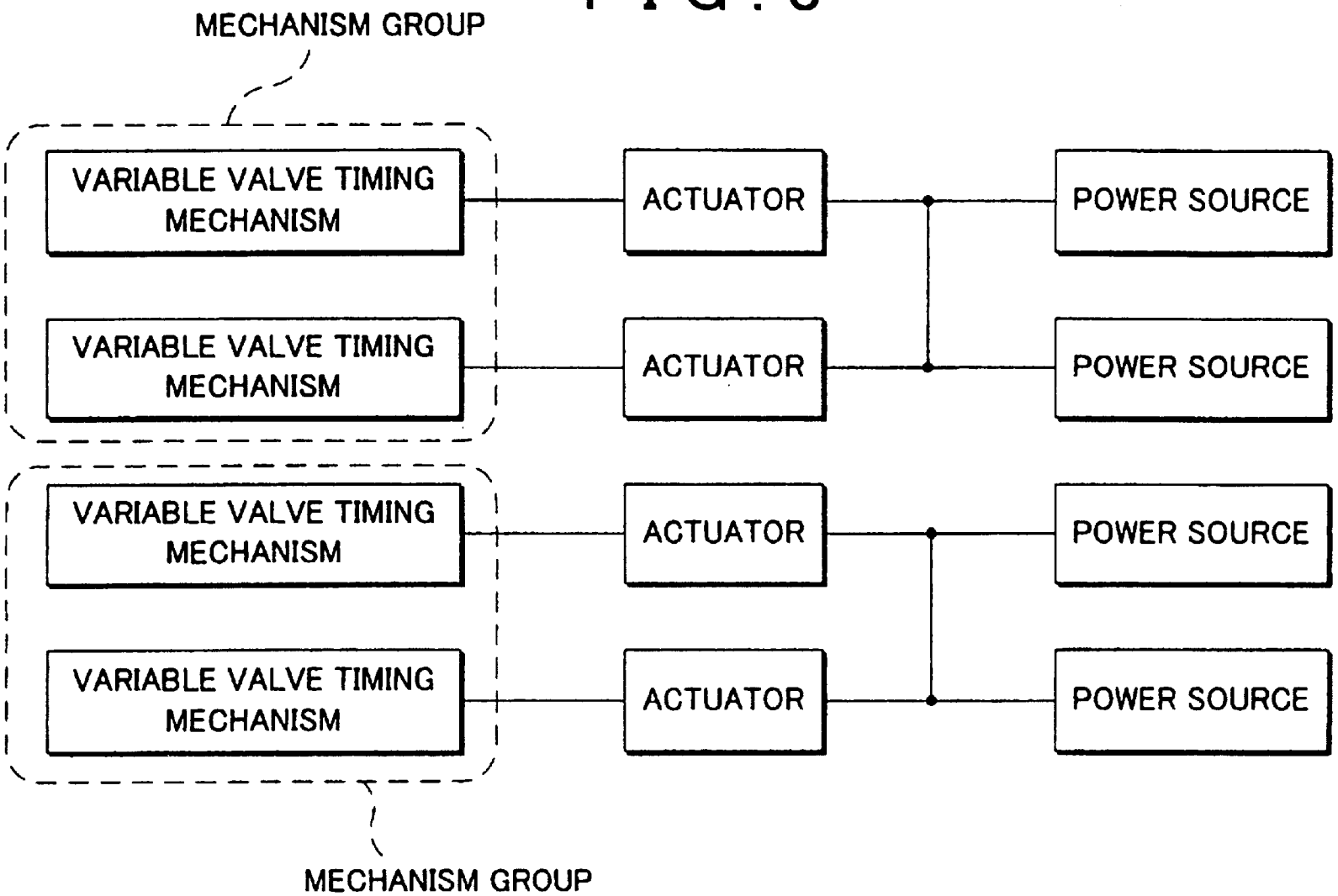
FIG. 8 is a block diagram showing a schematic structure of a valve characteristic changing apparatus according to another embodiment.
Figure 9:
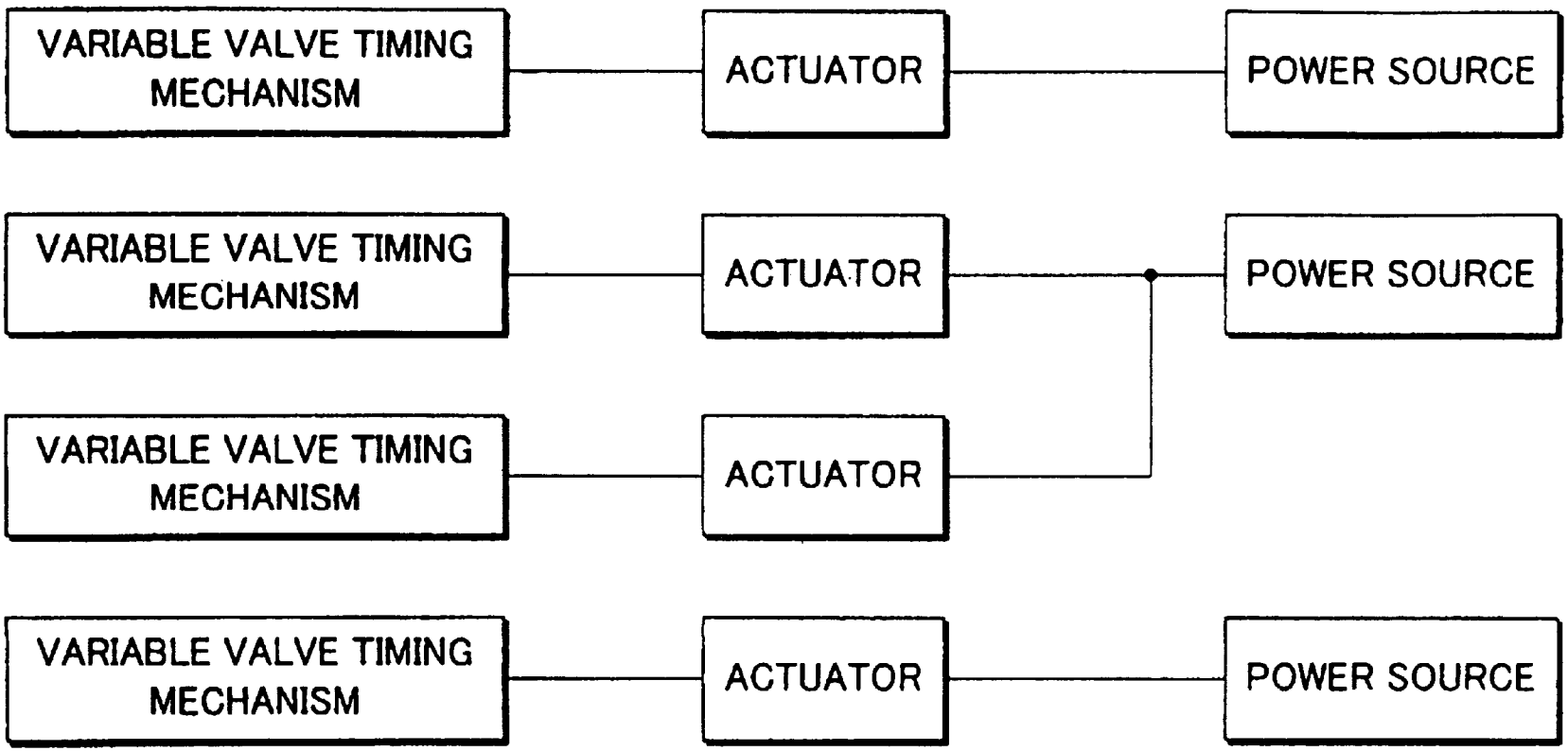
FIG. 9 is a block diagram showing a schematic structure of a valve characteristic changing apparatus according to another embodiment.

Furthermore, the invention is not limited to a structure with both the intake-side variable valve timing mechanism and the exhaust-side variable valve timing mechanism. The invention is applicable to any structure as long as it includes a plurality of variable valve timing mechanisms. For example, as shown in FIGS. 7 and 8, a plurality of variable valve timing mechanisms may be divided into a plurality of mechanism groups. One or more independent and separate power sources are provided for each mechanism group in the structure. Note that in such a case, as shown in FIG. 9, it is possible to divide the plurality of variable valve timing mechanisms into a configuration with individual variable valve timing mechanisms and a mechanism group formed from a plurality of variable valve timing mechanisms. Compared to a structure driving a plurality of variable valve timing mechanisms with a common power source, such a structure can easily secure the power required by each variable valve timing mechanism through separately provided independent power sources. It is thus possible to appropriately suppress a decrease in operation response in each of the plurality of variable valve timing mechanisms.

The invention is also applicable to an inline internal combustion engine with only one bank, as well as an internal combustion engine with a plurality of banks, such as a V-shaped internal combustion engine, horizontal opposed internal combustion engine or the like. In an internal combustion engine with a plurality of banks, more variable valve timing mechanisms are provided because variable valve timing mechanisms must be provided on each bank, thereby increasing the possibility of a decrease in operation response or the like as described earlier. According to the above configuration, it is possible to quickly converge each valve timing on a target valve timing in such a structure. Also, a configuration in which a independent and separate power sources are provided, and each of the power sources is provided for each bank as a power source of the variable valve timing mechanisms is another example of the above structure.

Figure 10:
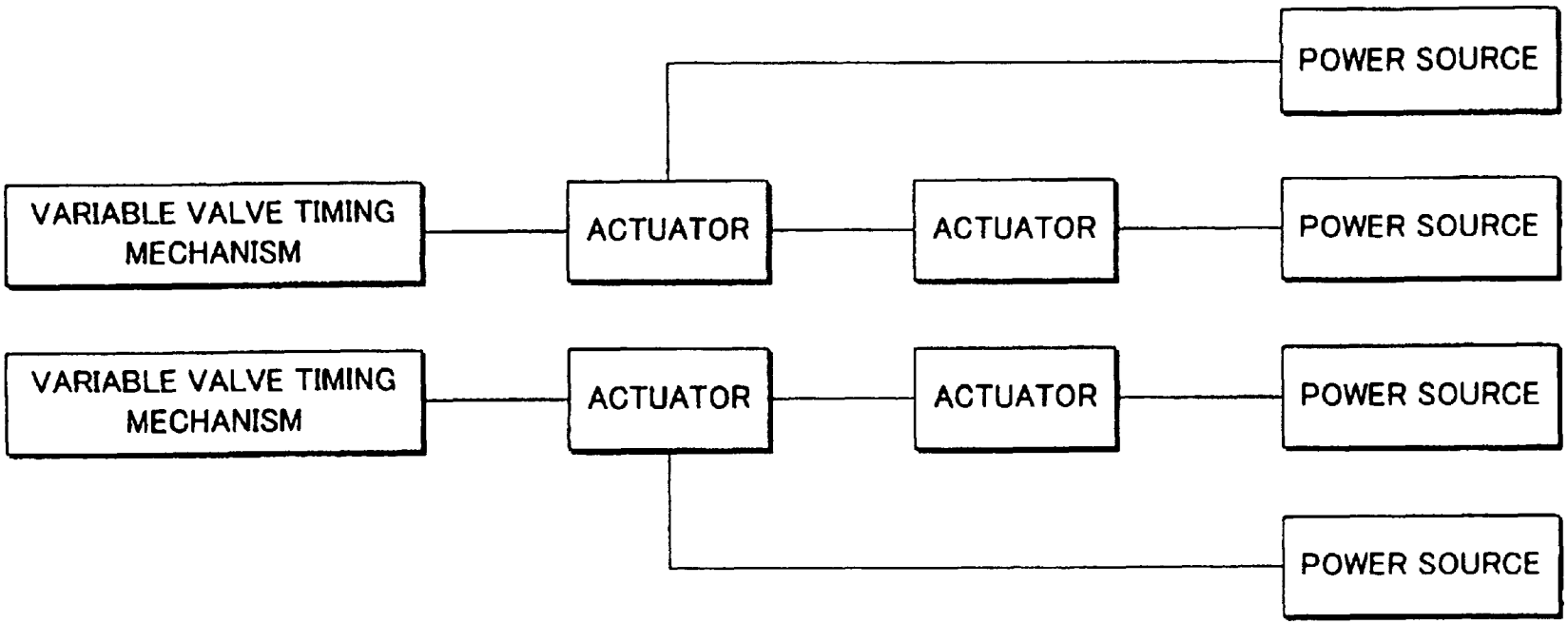
FIG. 10 is a block diagram showing a schematic structure of a valve characteristic changing apparatus according to another embodiment.

As shown in FIG 10, the invention is also applicable to an apparatus in which a plurality of variable valve timing mechanisms are provided corresponding to a set consisting of a camshaft and a cam pulley. In such a structure, the control mode may be set so as to drive the plurality of variable valve timing mechanisms by independent and separate power sources each of which corresponds to each variable valve timing mechanism when there is a possibility that operation response may decrease.

The invention is applicable to any internal combustion engine that is provided with a plurality of varying mechanisms each of which changes a valve characteristic of a plurality of engine valves. It should also be noted that a "valve characteristic" may more specifically refer to intake valve and exhaust valve characteristics such as an opening timing, closing timing, lift amount and the like, or any combination thereof.

What is claimed is:

1. A valve characteristic changing apparatus for an internal combustion engine comprising:

a first mechanism group which include at least one first varying mechanism that changes a valve characteristic of at least one first engine valve;

a second mechanism group which include at least one second varying mechanism that changes a valve characteristic of at least one second engine valve;

a first power source group including at least one first power source for the first mechanism group; and a second power source group including at least one second power source for the second mechanism group;

wherein a kind of the *at least one* first power source is different from a kind of the *at least one* second power source, the *at least one* first varying mechanism changes both an opening timing and a closing timing of the *at least one* first engine valve as the valve characteristic of the *at least one* first engine valve, and the *at least one* second varying mechanism changes both an opening timing and a closing timing of the *at least one* second engine valve as the valve characteristic of the *at least one* second engine valve, *and*

*the valve characteristic of the at least one first engine valve changed by the at least one first varying mechanism is the same as the valve characteristic of the at least one second engine valve varied by the second varying mechanism.*

2. The valve characteristic changing apparatus according to claim 1, wherein the first [varying] mechanism group is one varying mechanism, and the second [varying] mechanism group is one varying mechanism.

3. The valve characteristic changing apparatus according to claim 1, wherein the *at least one* first engine valve is an intake valve, the *at least one* second engine valve is an exhaust valve, the *at least one* first varying mechanism is an intake-side varying mechanism that changes a valve characteristic of the intake valve, and the *at least one* second varying mechanism is an exhaust-side varying mechanism that changes a valve characteristic of the exhaust valve.

4. The valve characteristic changing apparatus according to claim 3, wherein the first power source group generates power which is not dependent on an engine speed.

5. The valve characteristic changing apparatus according to claim 3, wherein a maximum power of the first power source group is not dependent on an engine speed.

6. The valve characteristic changing apparatus according to claim 4, wherein the intake-side varying mechanism has an electric motor that changes the valve characteristic, and the first power source group is a storage battery that supplies electric power to the electric motor.

7. The valve characteristic changing apparatus according to claim 3, wherein the second power source group is a hydraulic pump that is driven by an engine output.

8. The valve characteristic changing apparatus according to claim 7, wherein the hydraulic pump delivers, under pressure, lubricating oil to an engine lubricating system of the internal combustion engine.

9. The valve characteristic changing apparatus according to claim 1, wherein the first power source group is one power source.

10. The valve characteristic changing apparatus according to claim 1, wherein the second power source group is one power source.

11. A valve characteristic changing apparatus for an internal combustion engine comprising:

a first mechanism group which include at least one first varying mechanism that changes a valve characteristic of at least one first engine valve;

a second mechanism group which include at least one second varying mechanism that changes a valve characteristic of at least one second engine valve;

a first power source group which includes at least one first power source that supplies power to the first mechanism group and does not supply power to the second mechanism group; and a second power source group which includes at least one second power source that supplies power to the second mechanism group and does not supply power to the first mechanism group; wherein a kind of the *at least one* first power source is different from a kind of the *at least one* second power source, the *at least one* first varying mechanism changes both an opening timing and a closing timing of the *at least one* first engine valve as the valve characteristic of the *at least one* first engine valve, and the *at least one* second varying mechanism changes both an opening timing and a closing timing of the *at least one* second engine valve as the valve characteristic of the *at least one* second engine valve, *and*

*the valve characteristic of the at least one first engine valve changed by the at least one first varying mechanism is the same as the valve characteristic of the at least one second engine valve varied by the second varying mechanism.*

*12. The valve characteristic changing apparatus according to claim 1, wherein the at least one first power source is for the at least one first varying mechanism that requires good responsiveness when the valve characteristic of the at least one first engine valve is changed in a low engine speed region, and the at least one second power source is for the at least one second varying mechanism that requires good responsiveness when the valve characteristic of the at least one second engine valve is changed in a high engine speed region.*

*13. The valve characteristic changing apparatus according to claim 11, wherein the at least one first power source is for the at least one first varying mechanism that requires good responsiveness when the valve characteristic of the at least one first engine valve is changed in a low engine speed region, and the at least one second power source is for the at least one second varying mechanism that requires good responsiveness when the valve characteristic of the at least one second engine valve is changed in a high engine speed region.*

* * * * *